May 9, 1961 — A. FERRARI, JR — 2,983,184
FLOW CELL FOR COLORIMETRY OF A FLUID
Filed June 17, 1955
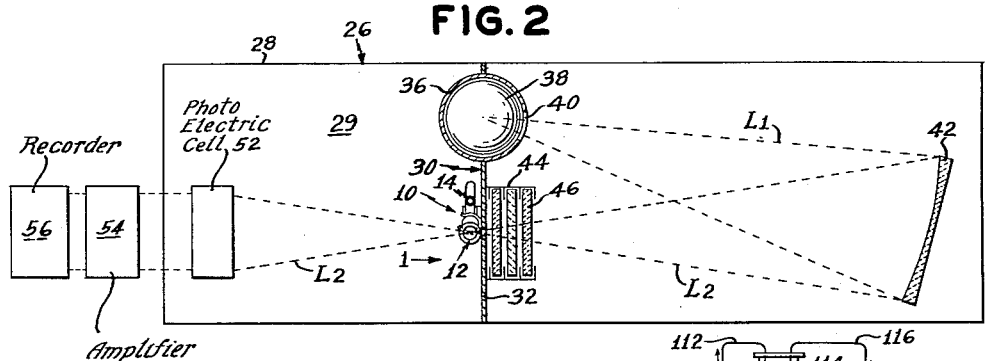
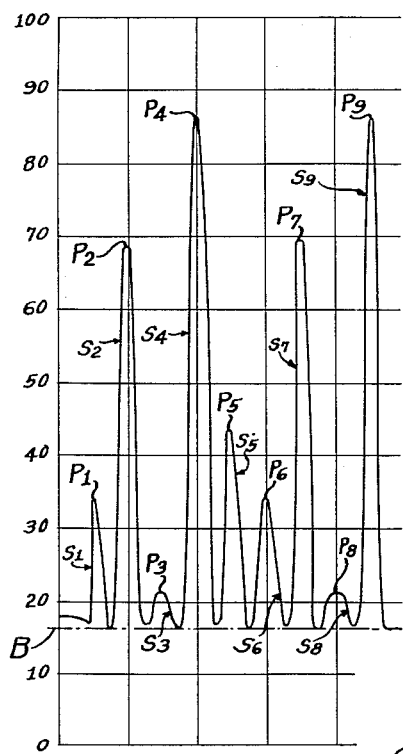
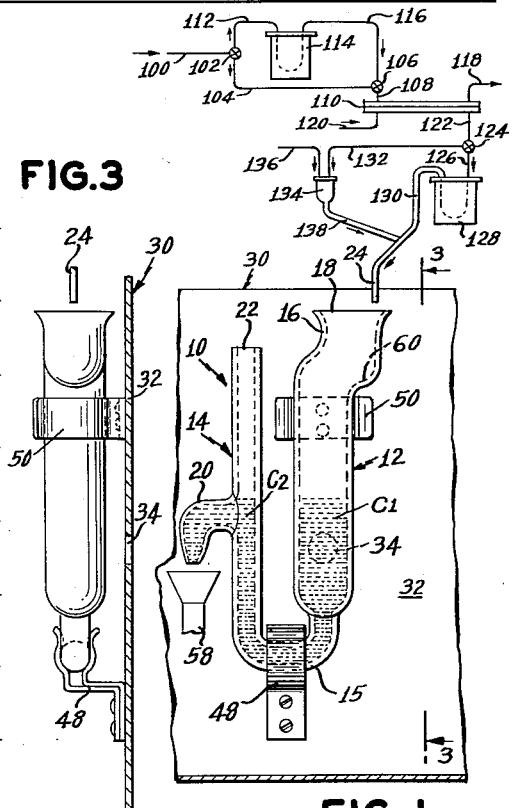
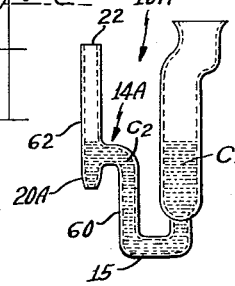
INVENTOR.
Andrés Ferrari Jr.
BY
ATTORNEYS United States Patent Office 2,983,184
Patented May 9, 1961

2,983,184

FLOW CELL FOR COLORIMETRY OF A FLUID

Andrès Ferrari, Jr., Scarsdale, N.Y., assignor, by mesne assignments, to Technicon Instruments Corporation, Chauncey, N.Y., a corporation of New York Filed June 17, 1955, Ser. No. 516,300

6 Claims. (Cl. 88—14)

The present invention relates, in general, to colorimeters and, in particular, to a light exposure device for the photo-electric viewing of a stream of liquid samples or the like.

An object of the present invention is the provision of a light exposure flow cell for a colorimetric recording apparatus which cell has provision for a continuous flow of liquid samples therethrough and wherein the movement of the liquid in the part of the cell, which is exposed to a light beam, is minimized so as to prevent fluctuations in the recording resulting from said movement.

Another object is the provision of a flow cell wherein the liquid, which is subjected to colorimetric examination, is formed into a column for exposure to a light source, and wherein provision is made to eliminate agitation of the liquid in the column as additional liquid flows into the column and to eliminate the surging of the liquid in the column as liquid flows out of the column.

Another object is the provision of a continuous flow cell wherein the liquid is formed into a column for exposure to a light source and wherein provision is made to prevent liquid, being introduced into the cell, from directly falling into the column and thereby to prevent the agitation or turbulence of the liquid in the column caused by such falling liquid.

Another object is the provision of a continuous flow cell for exposing the liquid to a light beam, wherein the liquid flowing through the cell is formed into a pair of balanced columns, and wherein provision is made to subject each of the columns to atmospheric pressure so that the hydrostatic pressure of said columns is maintained at equilibrium to prevent the surging of the liquid from one of said columns to the other of said columns, the liquid in one of said columns being exposed to the light source.

A further object is the provision of a continuous flow cell having a relatively simple construction which predetermines the rate of liquid flow therethrough. A still further object is the provision of a generally improved, simplified and relatively inexpensive continuous flow cell device for a colorimeter apparatus.

The above and other objects, features and advantages of the present invention will be more fully understood from the following description considered in connection with the accompanying illustrative drawings.

In the drawings which illustrate the best mode presently contemplated of carrying out the invention:

Fig. 1 is a view in elevation, on an enlarged scale, taken in the direction of the arrow 1 in Fig. 2, illustrating a continuous flow cell pursuant to the present invention, including a diagrammatic illustration of part of a body fluid analyzing apparatus;

Fig. 2 is a more or less diagrammatic view of a recording colorimeter assembly, the colorimeter being shown in plan view with its cover removed and being provided with a continuous flow cell pursuant to the present invention, certain of the components being illustrated schematically;

Fig. 3 is a sectional view taken on the line 3—3 of Fig. 1;

Fig. 4 illustrates a sample recording obtained from the colorimeter apparatus of Fig. 2; and Fig. 5 is a view similar to Fig. 1 and illustrates a modified form of flow cell.

Referring now to the drawings in detail, there is illustrated a continuous flow cell 10 pursuant to the present invention.

As here shown, the continuous flow cell 10 is constituted by a hollow U-shaped member having the laterally spaced arms or longitudinal portions 12 and 14 which are interconnected by the transversely extending neck portion or base 15. The arm 12 is provided at its upper end with an inlet portion 16 having an inlet opening 18. It will be noted that the inlet portion 16 is laterally offset from the arm 12, for a purpose hereinafter described in detail. The arm 14 is provided with an outlet spout 20 and is also provided, at the upper end thereof, with a vent opening 22, the function of which is hereinafter described in detail.

The continuous flow cell 10 may be utilized in connection with an analyzing apparatus of the type illustrated and described in the copending application of Leonard T. Skeggs, Serial No. 330,211, filed January 8, 1953, now Patent No. 2,797,149, and assigned to the assignee hereof. In such an apparatus, samples of body fluids are introduced in succession into the upper half of a dialyzer into which half one or more primary processing media are also introduced. Various secondary processing media are introduced into the lower half of the dialyzer and the diagnostically significant factor in the samples is diffused from the upper half into the lower half of the dialyzer where it enters the stream of liquid constituted by the secondary processing media and passes from the dialyzer. Provision is made to introduce air into both streams before they reach the dialyzer so as to break each stream up into a plurality of segments which are separated by air. Depending upon the particular analysis being made, as fully explained in said copending application, the sample and primary processing media may be subjected to a heating bath before entering the dialyzer, or the secondary processing media containing the diagnostically significant factor may be subjected to a heating bath after it leaves the dialyzer. In any event, the liquid which is to be subjected to a colorimetric examination, which liquid is constituted by a stream of dialyzates flowing from the dialyzer, is always a colored liquid which either had its color changed or became colored in the analyzing apparatus. The reference numeral 24 illustrates the discharge end of a line through which the colored dialyzate flows from the dialyzer into the continuous flow cell 10 for colorimetric examination.

The flow cell 10 is provided in the colorimeter 26. As here shown, the colorimeter has a housing 28 in which a baffle 30 is suitably mounted. Said baffle has a portion 32 in which there is defined a light aperture 34 and a circular portion 36 which constitutes a light-tight housing for a lamp or light source 38. The light housing 36 is provided with a light aperture 40 through which a light beam L1 from the light source 38 is directed at a reflecting mirror 42. The mirror reflects and focuses the light beam, as indicated by the reference numeral L2, at the light aperture 34 in the baffle 30. The baffle 30 mounts a filter holder 44 between the mirror 42 and the light aperture 34 thereof so that one or more filters 46 may be mounted therein, as may be required for a particular operation.

The flow cell 10 is mounted on the baffle portion 32 at the side opposite the side of said baffle portion which mounts the filter holder 44. In this connection, the baffle portion 32 is provided with the resilient or spring clips 48 and 50, preferably formed of metal. The spring clip 48 engages the neck portion 15 of the flow cell 10 and the spring clip 50 engages the longitudinally extending arm 12 thereof. The flow cell 10 may be readily mounted on the baffle 30 by first inserting the neck portion 15 into the spring clip 48 and then pivoting the flow cell toward the baffle to engage the arm 12 thereof in the spring clip 50. In the same manner, the flow cell 10 may be readily removed from the baffle by first pivoting the flow cell away from the baffle, using the spring clip 48 as a fulcrum, so as to disengage the flow cell from the spring clip 50 and then disengaging the flow cell from the spring clip 48. Due to the utilization of the spring clips 48 and 50 flow cells of different sizes or dimensions may be readily inserted into the colorimeter 26 and removed therefrom, as may be desired.

With the flow cell in position on the baffle 30, it will be noted that the arm 12 thereof is disposed in front of the light aperture 34 so that the reflected light beam L2, after passing through the filters 46, passes through the liquid within the arm 12 and is directed at the photoelectric cell or device 52. While the flow cell 10 is preferably made of glass, so that the entire flow cell is transparent or translucent, it will be understood that the flow cell can be made of any other suitable material and that only the portion thereof adjacent the light aperture 34 need be translucent to permit for the passage of the light therethrough for the purpose of energizing the photo-electric cell 52 after the light passes through the fluid within the arm 12. The baffle 30 and the housing 28 define a light-tight compartment 29 for the photo-electric cell from which stray light is eliminated when the housing is closed with a suitable cover.

The output of the photo-electric cell 52 is amplified in the amplifier 54 and then the output of the amplifier is fed to the recorder 56. The parts of the photometric system which include the previously mentioned colored filters 46, the photoelectric cell 52, the amplifier 54 and the recorder 56 are conventional and are arranged, as shown, in a manner well understood in the field of spectrophotometry, and are illustrated and described in detail in the previously identified copending application of Leonard T. Skeggs. The operation of these parts depends on the fact that where the fluid mixture which is passing through the continuous flow cell 10 is colored, its light-absorption characteristics, and therefore its light transmitting characteristics, are different from those of a colorless solution or a more highly colored solution, as a result of which the photo-electric cell is affected in a greater or lesser degree. The current developed in the photo-electric cell, amplified to suit the needs of the installation, constitutes the response produced by the analyzing apparatus, as described in the copending application, of which the colorimeter 26 may be one component. Figure 4 illustrates a typical recording of an analyzing operation wherein the increased concentration of the substance, for which the analysis is being made, decreases the color concentration of the reagent into which it is introduced. Under these conditions, maximum optical density is represented by the zero end of the scale and maximum light transmission is at the top end of the scale which also represents zero optical density. The reference numerals S1 through S9 represent individual successive recordings produced by the successive concentrations, in a series of samples, of the substance being analyzed. The base value B of each of said individual recordings represents the density value of the reagent before the substance is introduced therein. The reference numerals P1 through P9 indicate the peak light transmission values resulting from the successive concentrations of the substance.

In a case where the increased concentration of the substance increases the color concentration of the reagent and thus increases the optical density of the reagent, the recording is reversed. That is, the peaks will fall to the zero end of the scale, and the base values B, representing the reagent without the substance, will be close to the 100% end of the scale.

The U-shaped flow cell 10 defines a reflexed fluid flow path or passage from the inlet opening 18 to the outlet spout 20 from which the fluid is discharged into a drain 58. Said fluid passageway forms the liquid within the flow cell 10 into the pair of balanced columns C1 and C2, in the arms 12 and 14, as illustrated in Fig. 1.

Pursuant to an important aspect of the present invention, liquid motion or movement within said columns is minimized in order to prevent possible variations or fluctuations in the recording due especially to movement of the liquid within column C1 in the arm 12, through which the light passes from the mirror 42 to the photo-electric cell 52. In this connection, it will be noted, as previously described, that the inlet 16 to the flow cell 10 is laterally offset from the arm 12. Said laterally offset inlet is positioned below the discharge duct 24 so that the liquid issuing from the duct will not fall directly into the liquid column in the arm 12 but will pass through the inlet opening 18 to fall against the underlying inner surface portion 60 of the flow cell and will flow along the inner surface thereof into the liquid column in the arm 12. This prevents agitation or turbulence in the liquid column C1 which could result if the liquid entering the flow cell 10 falls directly into said column.

In addition to the foregoing, it will be noted that the previously mentioned vent opening 22 subjects the liquid column C2 in the arm 14 to the atmospheric pressure, the liquid column C1 in the arm 12 also being subjected to the atmospheric pressure through the inlet opening 18. With both balanced columns subjected to the same constant pressure, the hydrostatic pressures of the columns are in equilibrium and, consequently, surging of the liquid between the columns is eliminated, as the liquid flows out through the spout 20, so as to minimize the movement of the liquid in the column C1 which is subjected to the light beam.

As is also apparent from Figs. 1 and 5, the outlet spout is disposed at a level substantially below the inlet opening to the cell. Accordingly, the level of liquid column C1 is maintained at a level substantially below said inlet opening, and the air bubbles present in the liquid entering the cell are permitted to escape to the atmosphere before said liquid flows into the liquid column C1 thus preventing said bubbles from being trapped in said column.

It will be noted that the inner diameter of the arm 14 is smaller than the inner diameter of the arm 12. The rate of flow of the liquid through the flow cell is predetermined by the relationship of the inner diameter dimension of the arm 14 to the inner diameter dimension of the arm 12. Therefore, if it is desired to increase or decrease the liquid flow rate past the light beam L2, a flow cell having the required diametrical dimension for the arm 14 is utilized in the colorimeter.

The diameter of the arm 12 determines the extent or amount of fluid in the column C1 through which the light ray from the mirror 42 must pass to energize the photo-electric cell 52. Therefore, if it is desired to increase the amount of fluid through which the light ray must pass, this may be done by providing a flow cell 10 having an arm 12 of increased diameter. An increase in the diameter of the arm 12 results in an increase of the absorption or the optical density of the fluid. This is desirable when the fluid or the reagent being used in the previously mentioned analyzing apparatus has very little color change for a given series of concentrations of the substance or diagnostic factor for which the analysis is being made. Under such circumstances, an increase in the light path through the fluid provides greater sensitivity and therefore results in a recording having greater definition of the color change with change in concentration of the substance for which the analysis is being made. The spring clip mountings 48 and 50 facilitate the interchange of flow cells 10 to provide the desired flow rate and/or sensitivity.

While the continuous flow cell 10 has been described herein in connection with its use in a body fluid analyzing apparatus, it will be understood that it is not limited thereto and that it may be utilized in any colorimetric or photometric examining procedure involving a continuous flow of liquid. Also, while the flow cell has been illustrated and described in connection with a single-beam colorimeter, it will be understood that it is not limited thereto and that the flow cell may also be used in other types of colorimeters.

Fig. 1 illustrates the flow cell 10, as incorporated in a body fluid analyzing apparatus of the type fully illustrated and described in the previously identified application of Leonard T. Skeggs. In such an apparatus a mixture of a body fluid sample and one or more primary processing media, depending upon the sample being tested, is fed into the line 100. The two-way valve designated 102 permits the mixtures of processing media and sample to be directed to a dialyzer 110 by either of one or two alternate routes. One of these, for use, for example where a body fluid sample is being analyzed for glucose, is through line 104, through the two-way valve 106, and thence through the line 108 leading to the upper half of dialyzer 110; the other, for use where the analysis is, for example, for urea, is through line 112, through a coil in the low-temperature bath 114, and thence through line 116, two-way valve 106 and line 108. Whatever the nature of the mixture of processing media and sample, which depends on the nature of the diagnostically significant factor for which the analysis is being made, what remains after the diagnostically significant factor has been removed in dialyzer 110 is discarded through line 118.

The mixture of secondary processing media, for the particular sample being analyzed, is fed through line 120 to the lower half of dialyzer 110 whence it passes by means of line 122 into the two-way valve 124. If the analysis is being made for glucose, the dialyzate passes through the valve 124 into line 126. It proceeds thence to the high temperature water bath 128 and from the latter, the dialyzate passes through lines 130 and 24 to flow cell 10.

If, however, the analysis that is being made is not for glucose but for urea, the mixture which is fed to the lower half of the dialyzer 110 by way of line 120, after passing through the dialyzer, passes, as a dialyzate, through line 122, two-way valve 124 and line 132 into reaction tube 134. Simultaneously, the required reagent is admitted to reaction tube 134 by way of line 136, the final mixture passing into flow cell 10 by way of the discharge connection 138 and the outlet duct 24. Thus it will be apparent that the dialyzer 110, the bath 128 and the reaction vessel 134, each serves as a fluid treating chamber, depending upon the particular analysis being made, which chambers each having a liquid inlet and a liquid outlet which is in liquid-flow connection with the flow cell 10.

It will be noted that as the dialyzate is discharged from line 24 into flow cell 10, the air present between adjacent segments of said dialyzate freely escapes into the atmosphere since inlet opening 18 of said cell is open thereto. Thus it will be apparent that no air can be trapped into the liquid column C1 which is subjected to the light beam.

Referring now to Fig. 5 in detail, there is illustrated a modified form of flow cell 10A. This flow cell differs from the previously described flow cell 10, wherein the outlet 20 is laterally offset from the vent 22, to provide a construction wherein the vent is aligned with the outlet, the remainder of the flow cell being the same as flow cell 10. As here shown, the discharge arm 14A is formed by a portion 60 which extends upwardly from the neck 15, a portion 62 laterally offset from the portion 60, and a portion 64 which interconnects the portions 60 and 62. The portion 60 forms the liquid into the previously described column C2. The portion 62 is provided at its lower end, with an outlet or discharge spout 20A and at its upper end with a vent opening 22 which subjects the column C2 to atmospheric pressure, as previously described. The vertical alignment of the vent opening 22 with the outlet spout 20A subjects the liquid directly above the outlet spout to the atmospheric pressure and prevents the clogging of the flow cell in the area of the spout 20A by particles or foreign matter which otherwise would possibly be trapped in said area.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof and having a laterally outwardly offset portion in the path of flow of the liquid into said one cell portion whereby liquid entering the cell will flow against the inner surface of said one cell portion before flowing into said associated column, another of said cell portions being provided with said outlet means and having a vent opening spaced from said outlet means whereby the atmospheric pressure at said vent opening and at said vented inlet means maintains the hydrostatic pressures of said balanced liquid colums at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion.

2. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof, another of said cell portions being provided with said outlet means and having a vent opening spaced from said outlet means, whereby the atmospheric pressure at said vent opening and at said vented inlet means maintains the hydrostatic pressures of said balanced liquid columns at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion, said outlet means and said vent opening being in alignment.

3. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof and having a laterally outwardly offset portion in the path of flow of the liquid into said one cell portion whereby liquid entering the cell will flow against the inner surface of said one cell portion before flowing into said associated column, another of said cell portions being provided with said outlet means and having a vent opening spaced from said outlet means, whereby the atmospheric pressure at said vent opening and at said vented inlet means maintains the hydrostatic pressures of said balanced liquid columns at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion, said outelt means and said vent opening being in laterally offset relation to each other.

4. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof and having a laterally outwardly offset portion in the path of flow of the liquid into said one cell portion whereby liquid entering the cell will flow against the inner surface of said one cell portion before flowing into said associated column, another of said cell portions being provided with said outlet means and having a vent opening spaced from said outlet means, whereby the atmospheric pressure at said vent opening and at said vented inlet means maintains the hydrostatic pressures of said balanced liquid columns at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion, said translucent part of said one cell portion being longer than said other cell portion in the direction of the light path whereby the light path through the liquid in translucent part of said one cell portion is correspondingly increased.

5. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof and having a laterally outwardly offset portion in the path of flow of the liquid into said one cell portion whereby liquid entering the cell will flow against the inner surface of said one cell portion before flowing into said associated column, another of said cell portions being provided with said outlet means and having a vent opening spaced from said outlet means, whereby the atmospheric pressure at said vent opening and at said vented inlet means maintains the hydrostatic pressures of said balanced liquid columns at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion, said outlet means and said vent opening being in laterally offset relation to each other, said translucent part of said one cell portion being longer than said other cell portion in the direction of the light path whereby the light path through the liquid in said translucent part of said one cell portion is correspondingly increased.

6. A flow cell for exposing a liquid stream to a light beam for viewing by a photo-electric device, said cell having inlet means, outlet means, and cell portions extending between said inlet means and said outlet means to define a reflexed flow path for forming the stream into laterally related balanced liquid columns, at least one of said portions having a translucent part below said inlet means for exposing the liquid in the associated column to the light beam, said one cell portion being vented to the atmosphere and provided with said inlet means at the upper end thereof, another of said cell portions being provided with said outlet means and having a vent opening spaced from said outlet means, whereby the atmospheric pressure at said vent opening and at said vented inlet means maintains the hydrostatic pressures of said balanced liquid columns at equilibrium so as to prevent the surging of the liquid between said columns, said outlet means being disposed below said inlet means whereby to maintain the level of the liquid column in said one cell portion below said inlet means, whereby air bubbles in the liquid entering said cell will escape before said liquid flows into the liquid column in said one cell portion, said outlet means and said vent opening being in alignment, said translucent part of said one cell portion being longer than said other cell portion in the direction of the light path whereby the light path through the liquid in said translucent part of said one cell portion is correspondingly increased.

References Cited in the file of this patent

UNITED STATES PATENTS

| | | |
|---|---|---|
| 814,036 | Gerard | Mar. 6, 1906 |
| 1,900,893 | Hickman | Mar. 7, 1933 |
| 1,931,968 | Sweeney et al. | Oct. 24, 1933 |
| 2,288,065 | Benotti | June 30, 1942 |
| 2,467,599 | Schubart | Apr. 19, 1949 |
| 2,549,574 | Condiff | Apr. 17, 1951 |
| 2,649,011 | Black | Aug. 18, 1953 |
| 2,686,454 | Ruska | Aug. 17, 1954 |

FOREIGN PATENTS

| | | |
|---|---|---|
| 837,918 | France | Nov. 28, 1938 |
| 49,913 | France | June 6, 1939 |
| | (First addition to No. 837,918) | |
| 724,121 | Germany | Aug. 19, 1942 |

OTHER REFERENCES

85th Anniversary Catalog of Laboratory Apparatus and Supplies, Eimer and Amend, New York, copyright 1936, page 313 cited.